United States Patent
Cruz

(10) Patent No.: US 7,815,827 B2
(45) Date of Patent: Oct. 19, 2010

(54) METHOD OF PRODUCING SLABS OF ARTIFICIAL STONE AND POLYMERISABLE RESIN HAVING A VEINED EFFECT BY MEANS OF VIBRO-COMPRESSION UNDER VACUUM

(75) Inventor: Juan Cruz, Macael (ES)

(73) Assignee: Cosentino, S.A., Macael (ES)

( * ) Notice: Subject to any disclaimer, the term of this patent is extended or adjusted under 35 U.S.C. 154(b) by 0 days.

(21) Appl. No.: 11/917,548

(22) PCT Filed: Jun. 15, 2005

(86) PCT No.: PCT/ES2005/000339

§ 371 (c)(1),
(2), (4) Date: Aug. 18, 2008

(87) PCT Pub. No.: WO2006/134179

PCT Pub. Date: Dec. 21, 2006

(65) Prior Publication Data

US 2008/0315448 A1    Dec. 25, 2008

(51) Int. Cl.
    B29C 41/22    (2006.01)
(52) U.S. Cl. .................. 264/77; 264/71; 264/74
(58) Field of Classification Search ............ 264/71, 264/74, 77
See application file for complete search history.

(56) References Cited

U.S. PATENT DOCUMENTS 6,773,641 B1 *    8/2004    Toncelli .................. 264/71

FOREIGN PATENT DOCUMENTS

| EP | 0511545 | 11/1992 |
|---|---|---|
| EP | 1005967 | 6/2000 |
| ES | 2187313 | 6/2003 |
| GB | 2233640 | 1/1991 |

OTHER PUBLICATIONS

English translation of ES 2187313, Martos, Jun. 1, 2003.*

* cited by examiner

*Primary Examiner*—Eric Hug
*Assistant Examiner*—Jacob Thomas Minskey
(74) *Attorney, Agent, or Firm*—Sughrue Mion, PLLC

(57) ABSTRACT

The invention relates to a process for manufacturing artificial stone boards with polymerizable resins with a "veined effect" by means of the vibro-compaction under vacuum system comprising a first grinding phase of the different materials forming the filler, a second phase containing a resin with the catalyst and optionally a third phase consisting of the mixing of the two previous phases until the homogenization of the materials with the resin, a fourth phase of moulding and compaction of the obtained paste by vibro-compression under vacuum, a fifth hardening phase by polymerization of the resin by means of heating and a last cooling, cutting and polishing phase.

13 Claims, 1 Drawing Sheet

METHOD OF PRODUCING SLABS OF ARTIFICIAL STONE AND POLYMERISABLE RESIN HAVING A VEINED EFFECT BY MEANS OF VIBRO-COMPRESSION UNDER VACUUM

CROSS-REFERENCE TO RELATED APPLICATION

This application is a 371 of PCT/ES2005/000339, filed Jun. 15, 2005; the disclosure of which is incorporated hereby by reference.

A process for manufacturing artificial stone boards with polymerizable resin with a veined effect by means of the vibro-compression under vacuum system, similar to marbles, granite and other natural stones.

FIELD OF THE ART

The present invention relates to a process for manufacturing boards particularly with a veined effect.

The process is one comprising a grinding phase of different materials with varied granulometry forming the filler, another phase containing the resin with the catalyst and optionally a colouring, the mixing of said phases until the homogenization of the materials with the resin, a moulding and compaction phase of the obtained paste by vibro-compression under vacuum, and a hardening phase by polymerization of the resin by means of heating; ending with a cooling, cutting and polishing phase.

STATE OF THE ART

The process marketed by Breton S.p.A (Italy) who developed the technology called "Breton Stone" is described in U.S. Pat. No. 4,698,010 (Marcello Toncelli, Oct. 6, 1987) in which aggregates of a material of variable particle size are mixed with a binder (organic or inorganic), and after said mixture has been homogenized it is discharged into a mould which, in turn, is transferred to the interior of a press where it is subjected to pressure and vibration under vacuum, the mixture being hardened and giving as a result blocks that can be cut into others of smaller dimensions.

The product marketed by the authors of the present application as SILESTONE, formed by an aggregate of natural quartz and pigmented crystal and bound with polyester-type resin, based on patent ES 2 187 313 of Jun. 1, 2003, describes a process for manufacturing artificial stone boards formed by a mixture of ground materials of different granulometry of silica, glass, granite, quartz, ferrosilicon and/or other materials such as plastics, marbles and metals with liquid state polyester resins by vibro-compression under vacuum, heating, cooling and polishing, especially applicable for indoors and decoration.

The present authors have also developed several boards similar to those described previously with respect to the filler materials but which only use liquid methacrylate resin as polymerizable resin (international patent application PCT/ES2005/000152 applied for on Mar. 22, 2005) with which boards are obtained that are much more resistant to ultraviolet light so they can be used in outdoor walls, staircases and decoration without the risk of wearing which can be caused by the continuous exposure to rays of sunlight.

In the mentioned cases, the different appearance of the obtained boards is obtained by varying the composition and granulometry of the products forming the filler, colouring different proportions of said filler with various colours and subsequently homogenizing the entire filler until a more or less uniform colour is obtained. Nevertheless, in many cases it is desirable to obtain a board with different colours which will form well defined veins imitating natural stones, i.e. a "veined effect".

Two methods have been described for obtaining the type of board mentioned with veins of a colour different from the base. The oldest one is described in patent application EP 0 970 790 (Luca Toncelli, Jan. 12, 2000) and is based on the use of a machine, object of said patent, which first produces cavities in the surface of the mixture which will form the board and subsequently fills said cavities with the desired colouring. The most modern method is described in patent application WO 03/027042 (Luca Toncelli, Apr. 3, 2003) comprising two alternatives depending on whether the binding product forming the board is of the "cement" type or the "polymerizable resin" type, the powdered pigment being used in the first case and pigment in liquid form in the second case which is the one most closely related to the present invention. Once the base mixture formed by a granulated material and an aggregate has been made, it is deposited on a support and the solution containing the pigment is sprayed on the surface with a nozzle in a localized and random manner so that patches or blotches of another colour are produced without producing pigment agglomerations. Then, the mixture is subjected to the compaction phase with vibration under vacuum and subsequently to the hardening, cooling, cutting and polishing phase. Another variant of the method consists of the surface of the mixture being treated, before or after adding the solution with the pigment, with an instrument such as a rake conveying an undulating movement to the surface of the mixture such that the colouring solution is distributed more unequally. The result of this treatment after adding the solution with the pigment is that the patches or blotches of pigment deposited in the surface are distributed acquiring the desired veined effect.

However, there is not a continuity in the veined effect in all the depth of the board with the mentioned methods, i.e. the veining does not reach the lower face, nor the edges, which is noticed when the sides are polished, it being desirable sometimes to obtain a board in which the veined effect exists in all its dimensions so that it is visible both on the upper and lower surfaces and in the sides after cutting and polishing the board, such as for example in its use in decoration or staircases.

Therefore, the object of the present invention is a process for manufacturing artificial stone boards especially suitable for decoration, staircases or situations in which a veined effect is needed in the six surfaces, the two upper and lower faces and the four sides of said boards, comprising a grinding phase of the different materials forming the filler with varied granulometry, another phase containing the resin with the catalyst and optionally the colouring, the mixing of said phases until the homogenization of the materials with the resin, a moulding and compaction phase of the obtained paste by vibro-compression under vacuum, and a hardening phase by polymerization of the resin by means of heating, ending with a cooling, cutting and polishing phase, said boards being obtained with a veined effect due to the addition of a colouring, either during the mixing phase in upper mixers or inside the homogenization ring at the same time that the material falls from the upper mixers or onto the belt leading to the distributor before falling to the distributor or inside the distributor before distributing the material in the mould in order to pass to the vibro-compression under vacuum phase, such that the veined effect is observed in the final product on all the faces of the board even with continuity of the vein in the sides thereof.

The vein is based on being added in the areas of the process in which a subsequent mixing is produced so that the vein is distributed throughout the entire board.

EXPLANATION OF THE INVENTION

The invention is a process for manufacturing artificial stone boards with a "veined effect" comprising the following steps:

a) a grinding phase of the different materials of varied granulometry forming the filler;
b) another phase containing the resin with the catalyst, the accelerator, the binder and optionally the colouring;
c) mixing said phases until homogenization of the materials with the resin, divided into two parts, mixing inside the upper mixers and mixing in the homogenization ring.
d) transporting the homogenized mixture by means of a belt from which it falls to a distributor;
e) discharging, from the distributor to the moulds, the amount of filler necessary for making a board according to the dimensions of the mould;
f) protecting the mass formed by the boards with a paper such as Kraft paper, or with an elastomer, such as for example a rubber layer, in order to pass to
g) a moulding and pressing phase of the paste in each mould carried out by vibro-compression under vacuum;
h) a hardening phase by polymerization of the resin by means of heating;
i) ending with a cooling, calibrating, polishing and cutting phase.

The veined effect can be achieved in various ways: the colouring (either in solid or liquid form) can be incorporated in phase c) during the mixing of materials both in upper mixers and in the homogenization ring, d) in the journey of the mass towards the distributor or in the distributor itself, or also in phase e) when the mass is being distributed in the moulds, injecting the colouring in liquid form under pressure or in pigment form on the mass in any of the options. Subsequently, the pressing by vibro-compression under vacuum makes the vein be distributed not only on the surface but in the entire depth of the board.

The invention also includes boards obtained by said process.

DETAILED DESCRIPTION AND PREFERRED EMBODIMENT OF THE INVENTION

Figure 1:
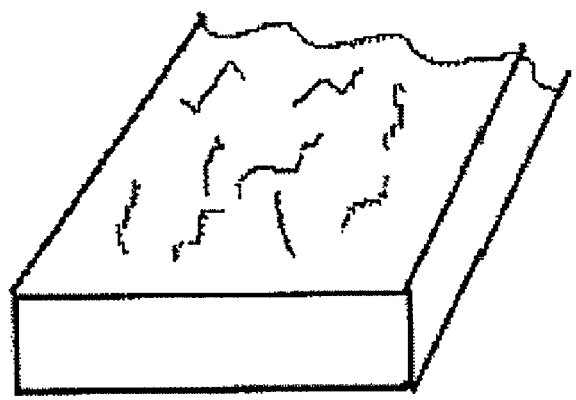
FIG. 1 represents a veined board A obtained according to a process of the state of the art and another veined board B obtained according to the process of the present invention.
Figure 1:
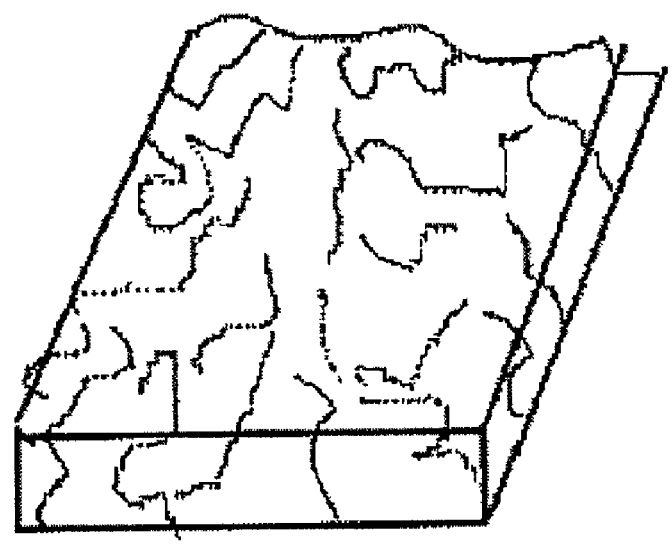

In order to obtain the veined boards object of the invention, materials of varied granulometry forming part of the filler, among others, marble, dolomite, opaque quartz, crystalline quartz, silica, glass, mirror, cristobalite, granite, feldspar, basalt, ferrosilicon etc. can be used, as long as they are compatible with the resin. Other filler materials can also be used, in the same granulometry as the materials indicated previously, such as coloured plastics, metals, woods, graphite etc.

The part of the filler used to obtain a specific decorative effect can be intimately mixed with the rest of the filler of similar granulometry or it can be placed on the surface afterwards.

The mentioned materials form part of the composition with the following granulometry:

10% to 70% of the filler, of micronized or ground powder, with a granulometry comprised between 0.1 mm to 0.75 mm;
1% to 80% of the filler, of ground material with a granulometry comprised between 0.76 mm and 1.20 mm; and optionally,
10% to 50% of the filler, of ground material with a granulometry comprised between 1.21 mm and 15 mm.

The percentage of each granulometry depends on the use of the board to be obtained, said percentages varying according to the colour and visual effect desired.

For the process, the starting material is prepared by grinding it until the desired granulometry is obtained, the different percentages of each granulometry being mixed and then being loaded in the planetary mixers.

Optionally, this filler can be distributed in different mixers such that a solid colouring or pigment is added to each mixer. If the colouring is a liquid it is added to the resin phase.

The resin phase is also prepared, preferably from unsaturated polyester, although it can also be another type of polymerizable and thermosetting resins such as methacrylate, epoxy resins etc. The resin forms part of the total mixture in a percentage comprised between 6% and 30%. It will generally incorporate the catalyst, the accelerator, the binder and optionally the colouring.

Method for Carrying Out the Veined Effect in Boards Made by Vibro-compression.

The new method for carrying out the veined effect in boards is based on the use of solid pigments and/or liquid colourings, independent of those used in the process of the mixers, so that these stand out on the already mixed mass of the mixers. These colourings can be inorganic, such as iron oxides, organic, phthalocyanines, either the solid pigment, with granulometries less than 0.75 mm, or dissolved (liquids) in a carrier compatible with the resin to be used and which may be polymerizable, with the catalysts and accelerators of the base resin: styrene, methacrylate, saturated or unsaturated resin, etc.

Various paths can be followed in order to achieve the veined effect:

a) Adding it to the upper mixers.
b) Adding it to the homogenization ring at the same time that the mixed material falls from the upper mixers.
c) Adding it to the belt leading to the distributor or in the distributor itself.

Adding the colourings to make the veins dissolved in resin causes the mixing times in the mixers of the resin with the filler to vary considerably so that the mixture is packed as much as possible and the resin is well absorbed in the fillers, i.e. in normal mixing conditions, this lasts 10 minutes, with the new system the mixing time has to be extended to more than 15 minutes and even to 20 minutes. Although the mixing time is longer, the process is the same, giving as a result a homogeneous mixture, preferably between 1000 and 2000 kg.

For case a), add it to the upper mixers.

Once the mixing has been carried out in the mixers and before discharging the mass to the homogenization ring, a new colouring, either as a pigment or as a liquid coloring, will be discharged very slowly onto the mass of each mixer and it will be stirred very slowly for 15 seconds so that the colour is dispersed on the surface of the mixture.

In order to achieve this, a new system has to be assembled for weighing the colouring in the mixers and the conditions of the automatic mixing cycle have to be varied so that it considers this new process of adding colouring after having added the coloured resin as usual.

Subsequently, the discharging onto the homogenization ring will be carried out and the homogenization will be performed by lowering the mixing fingers which are the mixing blades included in any mixer of this type.

Once the movement in the circular mixer has been completed, the mass will be led to the distribution area and pressed in the same conditions mentioned previously.

The following system for carrying out the veined effect is:

The mixing conditions in the mixers are varied in the same way as indicated previously and instead of introducing the new colour in the mixers themselves, it is poured while the mass is discharged from the homogenization ring, when it falls to the belt feeding the distributor or in the distributor itself, before filling the mould, forming the layers of each colour; in this way, it is also obtained that the new colour is superficially distributed on the surface in which injectors of the paint spray gun type are projected on the entire discharged mass and it is then homogenized inside the distributor and then led towards the pressing area. The way to introduce this new colour, in the case of introducing colouring in liquid form, is to pump it towards the mass in the form of spray or in a continuous swaying jet while the mass falls to the belt leading to the distributor or when the mass is mixed inside the distributor.

The colour is sprayed on the material which is being discharged by means of a system similar to spray gun painting with compressed air. A bridge is assembled on the belt or on the distributor, such that the colouring spray gun can move longitudinally on the bridge and cover all the material in its spraying process. The bridge moves to distribute the colouring simulating the effect of a hand that would support the gun and move it with a swaying motion. The material moves on the belt or inside the distributor at the same time as the spraying.

Another system for carrying out the veined effect is:

The mixing conditions in the mixers are varied in the same way as indicated previously and instead of introducing the new colour in the mixers themselves, it is poured while the mass is discharged in the homogenization ring, when it forms the layers of each colour; in this way, it is also obtained that the new colour is superficially distributed on the surface in which injectors of the paint spray gun type are projected on the entire discharged mass and it is then homogenized, lowering the homogenization fingers which are the blades included in any normal mixer and which are usually used for mixing and is then led towards the distribution and pressing area. The way to introduce this new colour, in the case of introducing colouring in liquid form, is to pump it towards the mass in the form of spray or in a continuous swaying jet while the mixer rotates and the masses of each main mixer are discharged.

The colour is sprayed on the material which is being discharged by means of a system similar to spray gun painting with compressed air. A bridge is assembled on the homogenization mixer, so that the colouring spray gun can move longitudinally on the bridge and cover all the material in its spraying process. The bridge moves to distribute the colouring simulating the effect of a hand that would support the gun and move it with a swaying motion. The material rotates inside the homogenization mixer and is being moved by the blades of this mixer at the same time as the spraying.

The solution of the second coloring in liquid form added to the gun preferably has the following formulation:
resin, 20% to 60% of the filler;
colouring, 30% to 70% of the filler;
styrene, 1% to 20% of the filler;
catalyst, 0.5% to 5% of the weight of the resin;
accelerator, 0.05 to 0.5% of the weight of the resin; and
binder, 0.5% to 5% of the weight of the resin.

In the case of solid pigment, the latter is introduced by weighing it in a suitable container and, by means of vibrating sieving, it will be added to the mass while the rotating mixer is discharged. In other words, the pigments are sprinkled in the rotating movement of the mass in the mixer and mixed with the homogenization blades.

The final veined effect is obtained in the press, i.e. this new colour added to the mixture, since it is superficially aggregated on the colours of the masses (mixtures) made in the mixers and introduced in the entire mass, when the boards are pressed in the press, and due to the vibro-compression and expansion system of the board, the new colour expands throughout the entire pressed board, giving a fine and continuous vein in the entire contour of the board and even a large continuity of the vein in the edges.

This obtained veined effect is independent of the system used as a protection of the boards before pressing, i.e. a paper or elastomer (rubber) etc. can be used as protection, considerably improving other already patented methods because it achieves leading the vein to the ends of the board and throughout the entire material, therefore, the vein in the board is available in all its surfaces and with the same features, favouring two-face polishing and the polishing of the edges.

The mixture thus obtained is transported by means of a belt and is taken to a distributor to make the boards. These are formed when the mass falls on the moulds which will have the dimensions which are desired for the boards. Generally, the boards will be rectangles from 50 cm×50 cm to 140 cm×310 cm with thicknesses comprised between 0.5 cm and 8 cm, the preferred size being those of 140 cm×310 cm and a thickness of 2 cm.

Subsequently, the mould with the load is protected with paper or rubber. Having protected and coupled the mixture in the mould, it is led to a vibro-compaction under vacuum press responsible for compressing the material and compacting it for which it first carries out the vacuum by removing the air and then presses the material by vibro-compression with a power of 6 kg/cm$^2$, the whole process lasting 2 to 3 minutes.

The pressed board is led to an oven at a temperature between 80° C. and 110° C. for the polymerization of the resin providing the board with hardness. The time that each board remains in the oven is 30 to 60 minutes.

Once it is out of the oven, the board is left to cool for approximately 24 hours at room temperature, later giving it the treatment which would be given to a conventional stone of marble, granite, etc, i.e. it is calibrated, polished and cut.

This obtained veined effect is independent of the system used as a protection of the boards before pressing, paper or rubber, improving the obtained board compared to those obtained by other methods of the state of the art, because it achieves leading the vein to the ends of the board and throughout the entire material, therefore, the vein in the board is visible in all its surfaces and has the same features, favouring two-face polishing and the polishing of the edges, unlike the other methods in which the colouring is sprayed on the surface of the mass of the board after the distributor when the product is not mixed again, with which once pressed, the paint penetrates 2 or 3 mm of the surface but does not reach the lower face therefore, the polishing offers different faces because the vein has not reached the lower face. The same occurs with the edges; since a rake-type device is used to stir the blotches of colouring placed in the surface, this rake does not reach the edges completely, therefore, they do not show the veined effect either when polished.

These boards with a "veined effect" can be used both indoors and outdoors in floors, countertops, facades, staircases, etc.

The invention claimed is:

1. A process for manufacturing artificial stone slabs having a veined effect comprising the following steps:
   (a) grinding different materials of varied granulometry so as to form a filler;
   (b) obtaining a composition comprising a polymerizable and thermosetting resin;
   (c) mixing the filler of step (a) with the composition of step (b) so as to obtain a homogeneous mixture;
   (d) transporting the homogeneous mixture of step (c) by means of a belt to a distributor;
   (e) discharging, from the distributor to a mould, an amount of said mixture necessary for making a slab according to the dimensions of the mould;
   (f) protecting the mixture with one of a paper and an elastomer;
   (g) moulding and pressing the mixture in each mould by compaction using vibro-compression under vacuum;
   (h) hardening, by polymerizing the resin in the resulting molded and pressed mixture of step (g) by means of heating in an oven;
   (i) cooling, calibrating, polishing and cutting said slab;
   wherein a coloring agent is incorporated in step (c) during mixing; during transporting in step (d) or in the distributor itself; or during step (e); and said coloring agent is incorporated by injecting in liquid form under pressure, such that the obtained slab has veins of said coloring agent distributed throughout the slab such that the vein would be visible throughout a cross-section of the slab; and
   wherein the mixing step (c) is of a duration so as to cause the filler to absorb the resin, and further, after incorporation of the coloring agent and the vibrocompression process, results in the obtained slab having veins of said coloring agent distributed throughout the slab such that the vein would be visible throughout a cross-section of the slab.

2. The process according to claim 1, wherein the coloring agent is a solid pigment.

3. The process according to claim 2, wherein the coloring agent is a solid pigment having a granulometry of less than 0.7 mm.

4. The process according to claim 1, wherein the coloring agent is a liquid coloring agent or a dissolved solid pigment forming a liquid solution.

5. The according to claim 4, wherein the coloring agent is incorporated by means of an arm which sprays such onto the mixture.

6. The process according to claim 4, wherein the coloring agent is dissolved in the polymerizable and thermosetting resin of step (b).

7. The process according to claim 4, wherein the coloring agent is dissolved in a monomer compatible with the polymerizable and thermosetting resin of step (b), incorporating the accelerator, catalyst and binder as in step (b).

8. The process according to claim 1, wherein the mixture is protected with Kraft paper or a rubber layer before being pressed.

9. A slab obtained by the process according to claim 1, wherein said slab has a veined effect in all faces of the slab.

10. The process according to claim 1, wherein the composition further comprises at least one of a catalyst, an accelerator, a binder and a coloring agent.

11. The process according to claim 1, wherein the heating is performed between 80° C. and 110° C.

12. The process according to claim 1, wherein mixing step (c) has a duration of at least 15 minutes.

13. The process according to claim 1, wherein the vibro-compression step presses the material with a power of 6 kg/cm$^2$, for a duration of 2 to 3 minutes.

* * * * *